United States Patent
Keith et al.

[15] 3,661,712
[45] May 9, 1972

[54] PROCESS FOR PRODUCING ZEARALENONE

[72] Inventors: Chester L. Keith, Manhattan, Kans.
[73] Assignee: Commercial Solvents Corporation
[22] Filed: June 18, 1970
[21] Appl. No.: 47,637

[52] U.S. Cl. ..............................195/36 R, 195/81, 424/279
[51] Int. Cl. .........................................................C12d 13/00
[58] Field of Search............................195/36 R, 81; 424/279

[56] References Cited
UNITED STATES PATENTS 3,196,019   7/1965   Andrews et al. ......................195/36 R

*Primary Examiner*—Alvin E. Tanenholtz
*Attorney*—Morton, Bernard, Brown, Roberts and Southerland

[57] ABSTRACT

Zearalenone is produced in an agitated, aerated, aqueous fermentation medium containing submergible, zearalenone-producing strains of *Gibberella zeae* and nutrients including assimilable carbon, nitrogen, and mineral sources.

18 Claims, No Drawings

PROCESS FOR PRODUCING ZEARALENONE

This invention relates to a process for the production of zearalenone by the cultivation of submergible, zearalenone-producing strains of *Gibberella zeae* in an agitated, aerated, aqueous nutrient fermentation medium and is particularly concerned with the use of a submerged fermentation procedure.

The production of the compound known as zearalenone and having the structural formula:

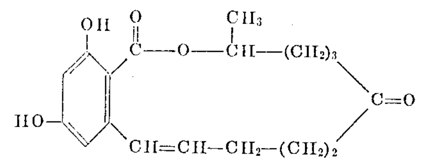

(also called F.E.S., for Fermentation Estrogenic Substance) by cultivation of the microorganism *Gibberella zeae* (Gordon) on a suitable nutrient is taught in U.S. Pat. No. 3,196,019. The production method disclosed in the patent involves incubating either the spores or the vegetative mycelia of the microorganism in a suitable inoculation medium, and then introducing the resultant inoculation medium into a fermentation medium containing one of the common grains, e.g., corn in finely divided form, as a source of carbohydrate. After a fermentation period of about 6 to 20 days, or more, the zearalenone so produced is recovered from the fermentation medium. The use of such a process, involving, as it does, the utilization of a solid phase fermentation medium, requires the employment of a generally more difficult recovery procedure than would be the case were a liquid phase fermentation medium used and the microorganism cultivated by submerged fermentation therein. Prior to the present invention, however, attempts to produce zearalenone by submerged fermentation have been decidedly unsuccessful.

It has now been surprisingly found that submergible, aerobic zearalenone-producing strains of *Gibberella zeae* (cultures of this type are on unrestricted deposit at the American Type Culture Collection "ATCC"), will efficiently produce zearalenone when cultivated by submersion in an agitated, aerated, aqueous, liquid phase fermentation medium containing nutrients including assimilable carbon, nitrogen and mineral sources. These strains are submergible, zearalenone-producing cultures of *Gibberella zeae* and include *Gibberella zeae* (Schw.) Petch strain 542 Keith ATCC 20273 and *Gibberella zeae* (Schw.) Petch strain Paul S. ATCC 20271.

Preferably, distilled water, deionized water, or tap water which has been heated to boiling and then filtered is used in the medium. Aeration of the medium is preferably effected by bubbling air therethrough, preferably sterile air, and preferably at a rate of about 0.25 to 2 volumes of air, calculated at atmospheric pressure, per volume of medium, per minute. The temperature of the medium is preferably maintained at about 20° to 28°, most preferably about 21° to 24° C. During the early stages of the fermentation, for example until zearalenone production has started, it is preferred not to allow the temperature to get much above 24° C. The medium is advantageously agitated to disperse and make air available to the microorganism and this can be effected by any suitable means, e.g., by a stirrer operating at about 200 to 500 RPM in a 20 liter fermenter.

The assimilable carbon source in the fermentation medium is advantageously glucose, e.g., reagent grade glucose. Cerelose, a white, crystallized, refined glucose, is a suitable source of glucose for the process. Also suitable, but less preferred, carbon sources are other carbohydrates which will not deleteriously affect the production of zearalenone, such as xylose, fructose, sucrose, and galactose. Xylose performs better when used in admixture with glucose (for example, at a ratio of 7.5 parts by weight of xylose to 22.5 parts by weight of glucose) than when used as the sole carbon source. If desired, a portion of the glucose, when employed, say up to about 50 weight percent thereof, can be substituted with glycerol. As an alternative to supplying actual glucose to the fermentation medium, a precursor thereof, such as starch, which, under the conditions of the process, will be converted to glucose, can also be used. The amount of assimilable carbon source used in the fermentation medium is that which is sufficient for production of zearalenone and, for example in the case of glucose, will generally range from about 20 to about 40, preferably about 25 to 35, grams of glucose per 100 cc. of the medium.

The assimilable nitrogen source for the fermentation medium can be either inorganic or organic, but preferably it is the latter. Ammonia-supplying, neutral compounds that are easily hydrolyzable are generally suitable. Examples of suitable nitrogen-supplying compounds are urea, asparagine, ammonium salts such as ammonium nitrate and ammonium fumarate, glutamine, glycine, ammonium hydroxide, and Sheffield's NZ Amine Type HD, a protein hydrolyzate. The preferred nitrogen source is urea, and this is generally employed in an amount in the range of about 0.2 to 0.8, preferably about 0.3 to 0.7, grams per 100 cc. of the fermentation medium.

The mineral sources included in the fermentation medium as nutrients include the elements, iron, phosphorus, potassium, sulfur, and magnesium, preferably in water soluble form. The amounts of the various minerals can vary considerably although each should be present in an amount sufficient to insure proper growth of the microorganism. Generally effective amounts of each of these elements, calculated as the free element, range from about 0.001 to 1 gram per 100 cc. of the medium. Preferred sources of these elements include dipotassium phospate (i.e., $K_2HPO$ 4), magnesium sulfate (e.g., supplied as $MgSO_4 \cdot 7H_2O$), potassium chloride, and, as a source of iron, sulfur and phosphorus, the aforementioned NZ Amine Type A. The potassium chloride can also function in the medium as an osmotic pressure-enhancing salt, as is hereinafter discussed. The preferred amount of dipotassium phosphate employed is about 0.05 to 0.3 grams per 100 cc. of medium, and the preferred amount of magnesium sulfate (calculated as $MgSO_4 \cdot 7H_2O$) is about 0.025 to 0.2 grams per 100 cc. of medium. Iron is an especially desired ingredient of the medium when the carbon source is reagent grade glucose.

There is preferably included in the fermentation medium used in the process of the present invention yield-enhancing amounts of a protein hydrolyzate, e.g., an enzymatic hydrolyzate or protein, most preferably an enzymatic hydrolyzate of casein, such as Sheffield's NZ Amine Type A and Amber's ECH. The Sheffield N-Z-Amine Type A is a pancreatic hydrolyzate of casein which contains, in the form of mixed amino acids and peptides, all amino acids originally present in casein. The hydrolyzate is preferably present in the medium in an amount of at least about 0.1 grams, say about 0.1 to 2 grams, per 100 cc. of the medium. The most preferred hydrolyzate is NZ Amine Type A. Less preferred, but operable, substitutes for the hydrolyzate are vitamin-free casein and casein itself. The use of an enzymatic hydrolyzate, for example NZ Amine Type A, has been indicated to be particularly useful where the carbon source employed is reagent grade dextrose.

There is also preferably included in the fermentation medium used in the present invention an amount of yeast extract, e.g., Difco yeast extract (sometimes called Bacto yeast extract), sufficient to enhance the yield of zearalenone. Generally suitable amounts of yeast extract range from about 0.05 to 0.2 grams per 100 cc. of the fermentation medium. An analysis of the composition of the mineral elements contained in Difco yeast extract is described in Journal of Bacteriology, Vol. 84, p. 869 (1962), hereby incorporated by reference. Other operable substitutes for yeast extract in the medium are corn gluten meal, corn steep liquor, Pharmamedia (a cotton seed-derived protein nutrient), Fermamine IV (an enzymatic digest of proteins), BYF–300 (a fraction of autolyzed Brewers yeast), and Nutrisoy (a defatted edible soy flour), however, yeast extract is preferred.

Growth promoting amounts of animal amino acids, e.g., about 0.1 to 0.3 grams per 100 cc. of the medium, of beef extract such as Difco's beef extract, can also be included in the medium.

A foam inhibitor, preferably one which will not deleteriously affect the production of zearalenone, is advantageously included in the fermentation medium. Those which have been indicated to be the least deleterious, so far as zearalenone yields are concerned, are the silicone foam inhibitors, e.g., Antifoam 10 (a non-ionic silicone emulsion containing about 10 percent silicone solids, a General Electric Co. product). Others which are effective, but which reduce zearalenone yields somewhat, include corn oil, lard oil, mineral oil, and fatty alcohols such as lauryl alcohol.

An osmotic pressure-enhancing salt can also be included in the fermentation medium used in the process of the present invention. Examples of such are the alkali metal salts, e.g., sodium acetate, sodium citrate, sodium succinate, sodium chloride, and potassium chloride. Most preferred are the alkali metal halides, e.g. sodium chloride and potassium chloride, and these are preferably present in an amount in the range of about 1 to 4 grams per 100 cc. of the medium.

Zearalenone yields and carbon source utilization appear to be improved when the medium is sterilized by autoclaving, for example for about 10 to 30 minutes for a volume up to 3 liters at about 10 to 20 psig of steam, prior to being inoculated.

The fermentation is advantageously allowed to proceed, in the process of the present invention, until substantially all of the assimilable carbon is used, generally for about 5 to 23 days, before the medium is subjected to a recovery treatment to recover the zearalenone therefrom. The zearalenone recovery can be effected by any suitable procedure, for example by filtering the medium, slurrying the filter cake with an aqueous alkaline solution so as to dissolve the zearalenone, filtering the slurry, acidifying the filtrate so as to precipitate out the zearalenone, and then recovering the precipitated zearalenone, which method is described in U.S. Pat. application, Ser. No. 721,604 of Hidy and Young, filed Apr. 16, 1968, and herein incorporated by reference.

The initial pH of the fermentation medium will generally be about 6.1 to 7.2, preferably about 6.2 to 7.0. As the fermentation proceeds, the pH declines. It will usually decline to a low of, say, about 3.4 to 4.0, often about 3.6 to 3.7, within about 2 to 4 days and will continue at these pH levels for the remainder of the fermentation. If nothing is then added to the medium to adjust the pH, it will remain at that level for the duration of the fermentation period. Fortunately, relatively few contaminating organisms can multiply at pH values below about 4.

The following examples are offered to illustrate the present invention.

EXAMPLE I

Production of Gibberella zeae (Schw.) Petch

Strain 542 Keith ATCC 20273

Macroconidia of *Gibberella zeae* strain ATCC 20028 were treated with a chemical mutagen according to the following procedure:

Macroconidia (about 1.3 × 10 $^6$/ml.) were suspended in phosphate buffer of pH 7.0 and dilutions were made from this stock to give 30–40 colonies per plate of an untreated culture on the plating medium described below. There was then added to he melted and cooled (45° C.) medium a sufficient amount of N-methyl-N′-nitro-N-nitrosoguanidine to give a final concentration of 2 micrograms per ml. Aliquots of conidial dilutions were added and the medium mixed and poured into Petri plates. The plates were incubated at 30° C. until colonies had developed to a sufficient size to permit visual inspection of colonial characteristics. The plating medium employed had the following composition:

Plating Medium

| | |
|---|---|
| Bacto-Tryptose | 15.0 grams per liter |
| Bacto-Soytone | 5.0 grams per liter |
| Bacto-Dextrose | 5.0 grams per liter |
| l-Cystine | 0.2 grams per liter |
| Sodium Chloride | 4.0 grams per liter |
| Sodium Sulfite | 0.2 grams per liter |
| Sodium Citrate | 1.0 grams per liter |
| Agar | 15.0 grams per liter |
| Distilled Water | balance |

Clones were picked on the basis of gross colonial morphology and pigmentation distinctive from strain ATCC 20028 and were maintained as agar slant cultures until testing.

The following is a morphological description of the organism grown on Czapek's dextrose agar, which has the composition:

Czapek's Dextrose Agar

| | |
|---|---|
| Sodium Nitrate | 2.0 grams/liter |
| Potassium Chloride | 0.5 grams/liter |
| Magnesium Sulfate | 0.5 grams/liter |
| Ferrous Sulfate | 0.01 grams/liter |
| Dipotassium Phosphate | 1.0 grams/liter |
| Dextrose | 50.0 grams/liter |
| Agar | 15.0 grams/liter |
| Distilled Water | balance |

The organism is a rapidly growing fungus, reaching a colony diameter of 3 to 7 cm. in four days at 22° to 30° C. In diffuse light or darkness a compact aerial mycelium develops close to the agar surface. Little or nor extensive cottony aerial mycelium is observed. The colony center exhibits a dark yellow color tending toward red at the edges. Cultures older than 5 days normally appear red overall. The reverse is a deep red as the result of the production of water insoluble pigment.

Production of macroconidia does not normally occur in darkness but is abundant under light. The macroconidia are borne in slimy masses, variable in length, ranging from 10 microns to 80 microns, and commonly contain from 3 to 5 septations but range from 0 to 9 septations. Macroconidia are oxhorn shaped and frequently have a demonstrable foot cell. The width of macroconidia is more constant, ranging from 2.0 to 5.0 microns, generally around 4.0 microns. Neither microconidia nor perithecia have been observed on laboratory media.

In the below-described sporulation medium macroconidia develop abundantly, borne singly on a simple conidiophore. Macroconidia do not, however, develop in complex liquid media of the type described. Chlamydospore formation is prevalent in older cultures, the spores being both intercalary and terminal.

Macroconidial Sporulation Medium

| | |
|---|---|
| Yeast Extract (Difco) | 1.0 gram/liter |
| Potassium Chloride | 0.5 gram/liter |
| Magnesium Sulfate | 0.5 gram/liter |
| Sodium Nitrate | 0.15 gram/liter |
| Ferrous Sulfate | 0.007 gram/liter |
| Ammonium Nitrate | 0.55 gram/liter |
| Dipotassium Phosphate | 1.0 gram/liter |
| Dextrose | 5.8 gram/liter |
| Distilled Water | balance |

Complex Medium—Non Sporulation

| | |
|---|---|
| Yeast Extract (Difco) | 1.0 gram/liter |
| Potassium Chloride | 0.20 gram/liter |
| Magnesium Sulfate | 0.25 gram/liter |
| Dipotassium Phosphate | 0.5 gram/liter |
| Urea | 4.1 gram/liter |
| NZ Amine-Type A (Sheffield) | 3.0 gram/liter |
| Cerelose | 110.0 gram/liter |
| Distilled Water | balance |

The vegetative mycelium or the spores are advantageously preserved at the temperature of liquid nitrogen.

EXAMPLE II

Modified Bennett's Medium

| | |
|---|---|
| Cerelose | 1.1 grams per 100 cc. medium |
| NZ Amine-Type A (Sheffield) | 0.4 grams per 100 cc. of medium |
| Difco Yeast Extract | 0.1 grams per 100 cc. medium |
| Sodium Chloride | 0.25 grams per 100 cc. medium |
| Distilled Water | balance |

One hundred ml. of the above medium was placed in a 500 ml. Erlenmeyer flask and autoclaved at 15 psig for 15 minutes. Spores of *Giberella zeae* (Schw.) Petch strain 542 Keith ATCC 20273 were then added to the medium and incubated therein for 24 hours at 30° C. on a rotary shaker. The resultant material was used to inoculate a second 100 ml., autoclaved portion of the modified Bennett's medium, and this second stage was also incubated for 24 hours at 30° C. on a rotary shaker.

Fermentation Medium

| | |
|---|---|
| Cerelose | 33 g. per 100 cc. medium |
| Urea | 0.4 g. per 100 cc. medium |
| Bacto Yeast Extract | 0.1 g. per 100 cc. medium |
| NZ Amine-Type A (Sheffield) | 0.3 g. per 100 cc. medium |
| $MgSO_4 \cdot 7H_2O$ | 0.025 g. per 100 cc. medium |
| $K_2HPO_4$ | 0.05 g. per 100 cc. medium |
| KCL | 0.025 g. per 100 cc. medium |
| Distilled Water | balance |

One hundred (100) ml. of the above medium was placed in a 500 ml. flask and autoclaved at 15 psig steam for 15 minutes. There was then added to the flask as an inoculum, 10 cc. of the second stage material obtained from above. The inoculated medium was then incubated for 2 weeks at 20° C. on a rotary shaker turning at 300 RPM, at the end of which period zearalenone was determined to be present in the medium in a concentration of 15.2 grams per liter.

EXAMPLE III

To 1,500 ml. of autoclaved modified Bennett's medium in a 6-liter Erlenmeyer flask was added 100 ml. of a first stage seed material of ATCC 20273 prepared as in Example II. The flask was then incubated on a reciprocating shaker at 30° C. for 24 hours to yield a final inoculum stage.

Fermentation Medium

| | |
|---|---|
| Difco Yeast Extract | 15.0 grams |
| NZ Amine-Type A | 45.0 grams |
| KCl | 3.75 grams |
| $MgSO_4 \cdot 7H_2O$ | 3.75 grams |
| $K_2HPO_4$ | 7.5 grams |
| Cerelose | 4950 grams |
| Urea | 61.5 grams |
| Distilled Water | (to bring to 13.5 liters) |
| General Electric's Antifoam 10 | 15 ml. |

The above batch of fermentation medium was distributed among three 6-liter flasks and therein autoclaved for 30 minutes at 15 psig. The cooled medium was then charged to a sterile, 20-liter Fermentor and inoculated with 1,500 ml. of the above inoculum. Air flow through the fermentor was 3 liters per minute at about 2 to 2.5 psig. Agitation speed was 250 RPM, and the temperature of the medium was maintained at 20° C. After 15 days the zearalenone concentration reached 12.529 grams per liter.

EXAMPLE IV

Fifty (50) gallons of the modified Bennett's medium of Example II was placed in a 100 gallon stainless steel fermentor and therein sterilized with 121° C. steam for 15 minutes. After cooling to about 28°–30° C., the medium was inoculated with 3 liters of an inoculum of ATCC 20273 which had been prepared as in Example II. The inoculated medium was then aerated (3 cubic feet per minute of air at 2–3 psig) and stirred (100 RPM) for 24 hours at 28°–30° C., whereupon the culture growth was judged to be sufficient (280 mg. per 100 ml. of medium) for use as inoculum in a production phase fermentation.

Fermentation Medium

| | |
|---|---|
| Bacto Yeast Extract | 265 grams |
| KCl | 66 grams |
| $MgSO_4 \cdot 7H_2O$ | 66 grams |
| $K_2HPO_4$ | 133 grams |
| Cerelose | 193 pounds |
| Urea | 1087 grams |
| General Electric's Antifoam 10 | 60 ml. |
| Distilled Water | (to bring to 70 gallons) |

The above fermentation medium was placed in a 100 gallon fermentor, sterilized with steam for 15 minutes at 121° C., cooled to 20° C., and inoculated with approximately 6 liters of the seed culture. The temperature of the medium was then maintained at 20° C. and sterile air was bubbled through the medium at a head pressure of 3 psig (4 CFM) while the medium was stirred at 200 RPM. After 8 days the pH of the medium was 3.8. It was then adjusted to 8.0 by addition of urea and ammonium hydroxide. The pH was then brought down to 5.6 by the addition of nitric acid. On the 19th day of operation the level of zearalenone in the medium was 8.829 grams per liter, and the volume of the medium was 64 gallons.

EXAMPLE V

The procedure of Example III is used under essentially the same conditions except *Gibberella zeae* (Schw.) Petch strain Paul S. ATCC 20271 is used instead of ATCC 20273 to produce zearalenone.

It is claimed:

1. A process for the production of zearalenone which comprises cultivating a submergible, aerobic zearalenone-producing strain of the microorganism *Gibberella zeae* while the microorganism is submerged in an agitated, aerated, aqueous, liquid phase fermentation medium containing assimilable carbon, nitrogen and mineral sources, to produce zearalenone.

2. The process of claim 1 wherein the microorganism is *Gibberella zeae* (Schw.) Petch strain 542 Keith ATCC 20273 or *Gibberella zeae* (Schw.) Petch strain Paul S. ATCC 20271.

3. The process of claim 2 wherein the carbon source is glucose.

4. The process of claim 3 wherein the glucose is employed in an amount of about 20 to 40 grams per 100 cc. of the fermentation medium.

5. The process of claim 2 wherein the nitrogen source is urea.

6. The process of claim 4 wherein the nitrogen source is urea which is employed in an amount of about 0.2 to 0.8 grams per 100 cc. of the fermentation medium.

7. The process of claim 6 wherein air is conducted into the medium at a rate of about 0.25 to 2 volumes, calculated at about atmospheric pressure, per volume of medium, per minute.

8. The process of claim 1 wherein the medium is maintained at a temperature of about 20° to 28° C.

9. The process of claim 6 wherein the medium is maintained at a temperature from about 20° to 28° C.

10. The process of claim 6 wherein the mineral source includes yeast extract.

11. The process of claim 6 wherein the fermentation medium contains an effective amount of a foam inhibitor.

12. The process of claim 11 wherein the foam inhibitor is a silicone oil.

13. The process of claim 10 wherein the mineral source includes phosphorus, potassium, sulfur, iron and magnesium.

14. The process of claim 10 wherein the water in the medium is selected from the group consisting of deionized water, distilled water, and tap water which has been heated to boiling and then filtered.

15. The process of claim 10 wherein the fermentation medium contains a growth promoting amount of a hydrolyzate of protein.

16. The process of claim 15 wherein the hydrolyzate is an enzymatic hydrolyzate of casein and is present in the medium in an amount of at least about 0.1 gram per 100 cc. of the medium.

17. The process of claim 6 wherein the fermentation medium contains an effective amount of an osmotic pressure-enhancing salt.

18. The process of claim 17 wherein the salt is selected from the group consisting of sodium acetate, sodium citrate, sodium succinate, sodium chloride, and potassium chloride.

* * * * *